July 24, 1923.

C. E. DAVIS

APPARATUS FOR HANDLING ORE

Filed May 20, 1920

Inventor
Charles E. Davis
By: Clarence F. Poole  Atty.

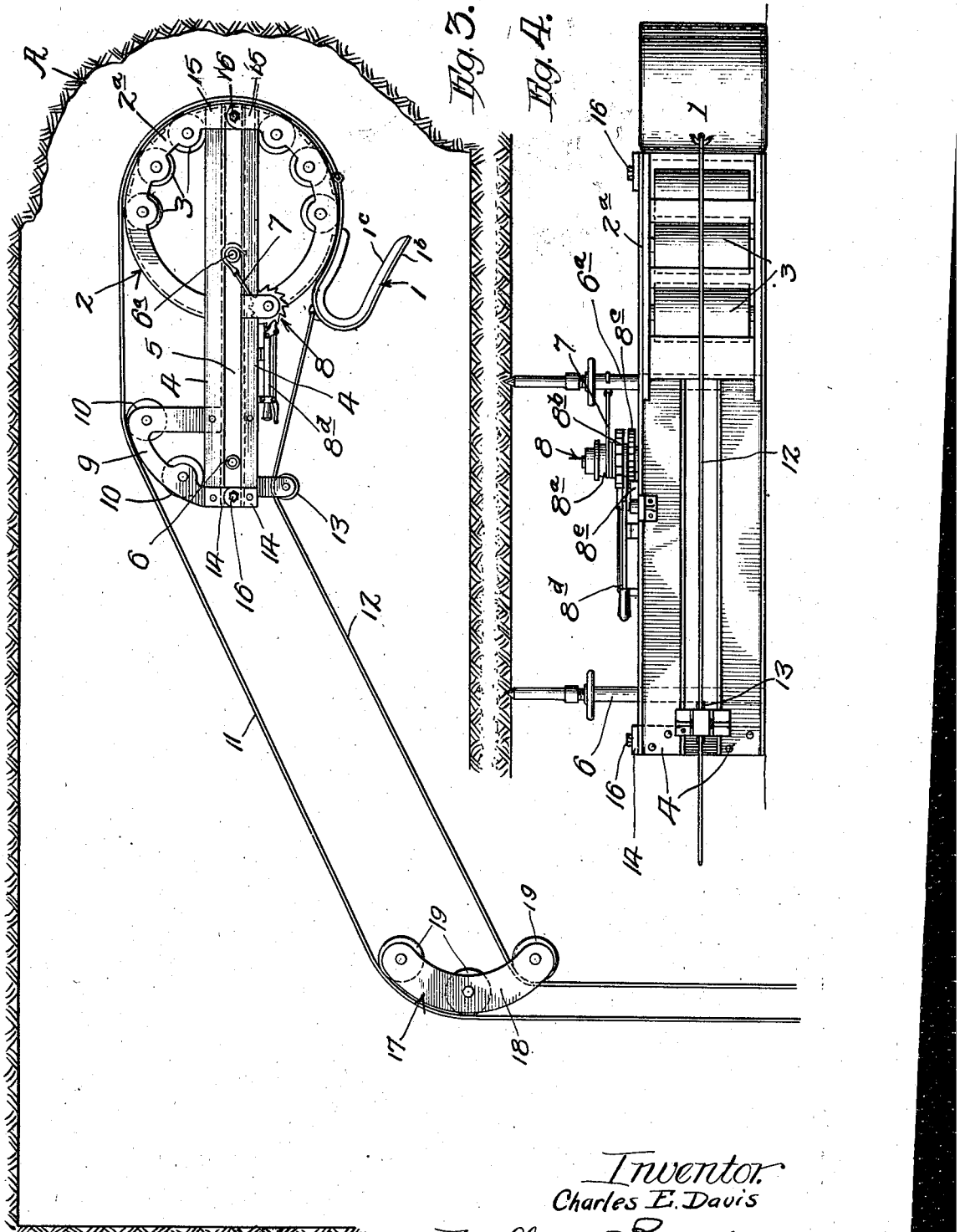

Patented July 24, 1923.

1,462,688

UNITED STATES PATENT OFFICE.

CHARLES E. DAVIS, OF CHICAGO, ILLINOIS, ASSIGNOR TO GOODMAN MANUFACTURING COMPANY, OF CHICAGO, ILLINOIS, A CORPORATION OF ILLINOIS.

APPARATUS FOR HANDLING ORE.

Application filed May 20, 1920. Serial No. 382,696.

*To all whom it may concern:*

Be it known that I, CHARLES E. DAVIS, a citizen of the United States, residing at Chicago, in the county of Cook and State of Illinois, have invented an Apparatus for Handling Ore, of which the following is a specification.

This invention relates to improvements in apparatus for handling ore and the like and has for its principal object to provide a simple and durable conveying apparatus which may be economically operated for transporting loose material from one place to another, and a new method of operating the same. My invention may best be understood by reference to the accompanying drawings, in which Figure 1 is a plan view of my apparatus in one working position in a mine.

Figure 3 is a view of the same apparatus in a third position.

Figure 4 is an enlarged view of the apparatus in elevation.

Figure 1:
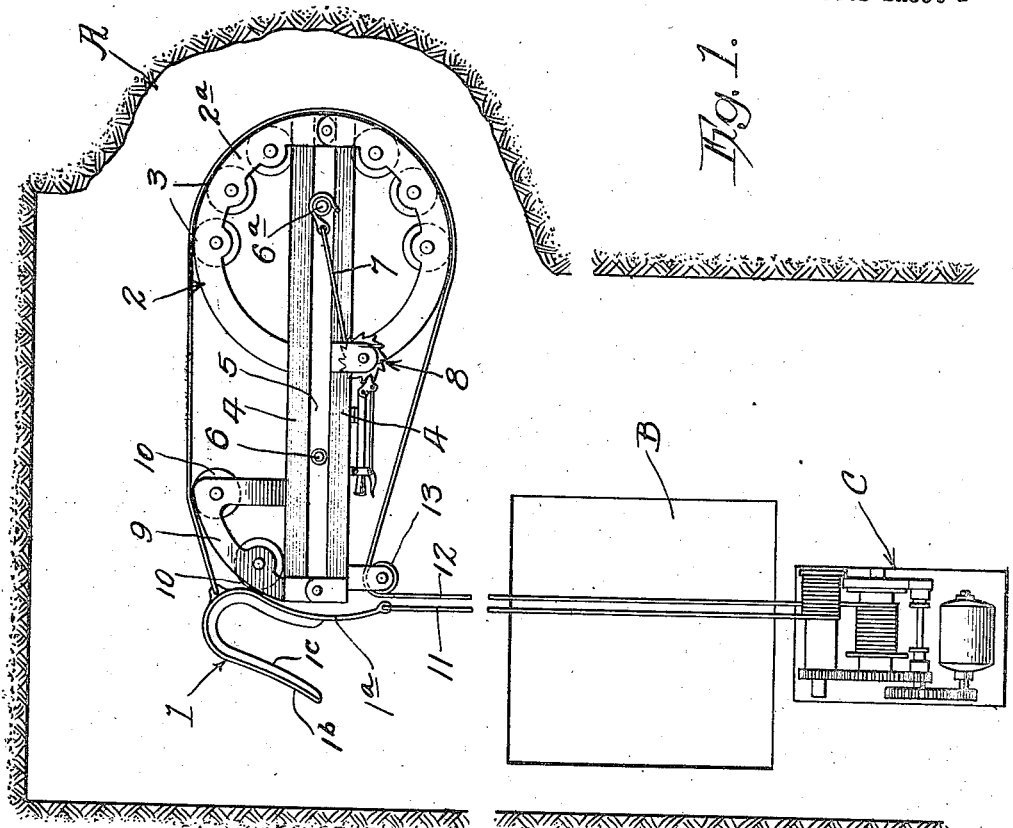

In the embodiment of my invention illustrated herewith, my apparatus is shown as used in mining operations in which loose material is to be transported from the working face, or place from which the material is being mined, to a suitable loading chute. In Figure 1, the working face is indicated at A, at a point removed from a loading chute B, which may be of any usual arrangement, or construction. The ore, or similar material, is broken down from the working face A and deposited on the floor of the mine, and in loose condition suitable for removal to the loading chute B. My loading apparatus comprises a conveyor device, such as a scraper, or scoop 1, and a guiding frame 2. The scraper 1 is preferably bottomless, and has one side 1$^a$ thereof curved so as to conform substantially with the curved forward end 2$^a$ of the guiding frame 2. Said guiding frame is provided with a pair of rearwardly extending beams 4, 4 having a slot 5 therebetween. The forward portion A of the guiding frame is preferably provided with a plurality of rollers 3, 3, and forms a guiding and bearing surface for the scraper 1. The frame 2 is adapted to be held in place by means of a guiding device, such as a pair of jacks 6, 6$^a$, of the usual type, adapted to be inserted in the slot 5. The jacks 6 and 6$^a$ are spaced apart so as to guide the movement of the frame in a longitudinal direction. Movement of the frame is preferably accomplished by means of a draft device which may comprise a flexible cable 7, adapted to be fixed at a forward end to some suitable anchor, as for instance, the forward jack 6$^a$, and operated by means of a ratchet device comprising a drum 8$^a$, a pair of ratchet wheels 8$^b$ and 8$^c$, an operating lever 8$^d$ for operating the ratchet wheel 8$^b$, and a pawl 8$^e$ for engaging the ratchet wheel 8$^c$. It will be seen that the pawl 8$^e$ serves to retain the drum 8$^a$ stationary while the handle 8$^e$ is being manipulated to wind up the cable 7. It will be understood however, that any equivalent means may be provided for moving the guiding frame forwardly with respect to the fixed guiding jacks 6 or 6$^a$, as the loading operation proceeds.

Figure 2:
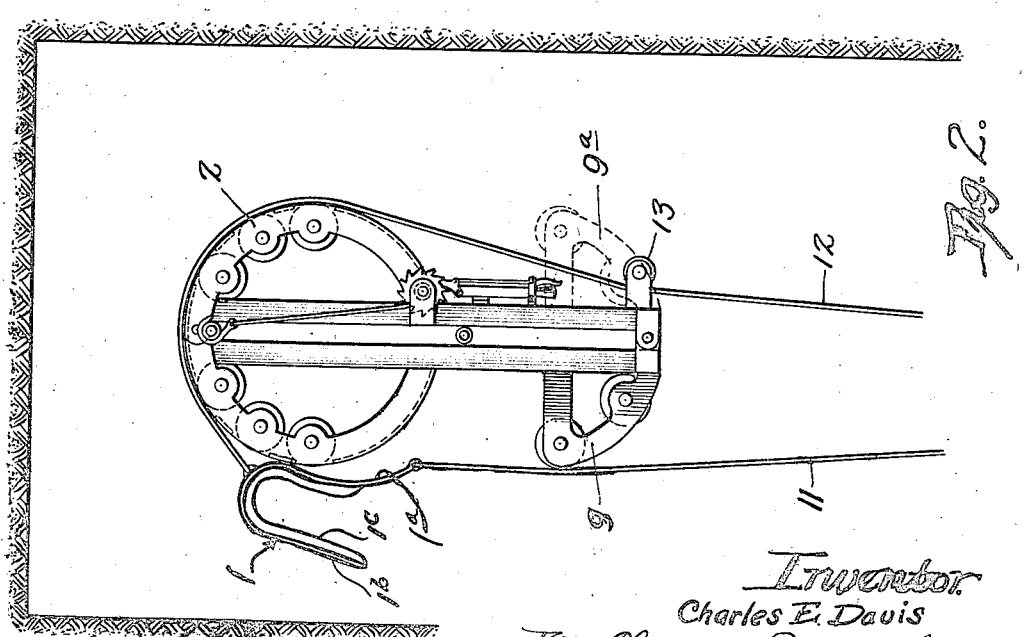
Figure 2 is a view of my apparatus in another position.

It will be observed by reference to Figures 1, 2 and 3, that the guiding apparatus may be directed at varying angles toward the material to be loaded, by suitable arrangement of the guiding devices 6 and 6$^a$. When directed at an angle, however, such as shown in Figure 1, a suitable bracket 9 is attached to the rear end of the longitudinal beams 4, 4, as shown. This bracket preferably carries a plurality of rollers 10, 10, similar in construction to rollers 3, 3, before described in connection with the curved end 2$^a$ of the forward end of the frame 2. The scoop 1 is operated by means of suitable draft ropes comprising a head rope 11 and a tail rope 12. The curved inner side 1$^a$ is preferably longer than the opposite side 1$^b$ of the scraper so that the former side extends forwardly beyond the upright forward margin 1$^c$ which forms the cutting edge of the scraper as it is gathering its load. The head rope is attached at or near the forward end of the inner side 1$^a$ and the tail rope 12 is attached to the rear of the scraper and preferably to one side of the longitudinal axis thereof, as shown. The draft ropes may be operated by any suitable mechanism, such as hoisting engine C, positioned beyond the loading chute B so as to draw the scraper 1 to the said chute to be unloaded. I also provide a sheave 13 on the rear end of the apparatus opposite the bracket 9 for the purpose of guiding the tail rope 12. It will be observed, however, that the bracket 9 and the sheave 13 are interchangeable, and that the scoop and draft ropes are adapted to move in either direction about the guiding frame 1. This arrangement allows the apparatus to be directed either to the right or to the left, so as to completely remove material from spaces of varying widths, as desired.

In order to render my apparatus easily portable, I provide means for detachably separating the apparatus into a plurality of sections, which means may comprise overlapping end members 14, 14 and 15, 15, on opposite ends of the beams 4, which members are connected together by any suitable means such as bolts 16, 16.

Where it is necessary to deflect the draft ropes and to change the path of movement of the scraper, I provide a guide member 17, adapted to be fixed by a jack in the usual manner. This guide member comprises an arcuate frame portion 18, and carries suitable rollers 19, 19, forming a curved bearing surface conforming substantially with the curved side 1ª of the scraper, so that the course of the draft ropes and the scraper may be deflected, as shown in Figure 3.

The use and operation of the apparatus above described is as follows:

The guiding frame 2 is positioned adjacent the pile of material to be removed or transported, and the draft ropes are connected with a winding engine suitably located to move the scraper toward the loading chute, or place where the material is to be unloaded. The scraper is pulled rearwardly by the tail rope 12 about the guiding frame until the open end of the scraper faces the pile of material, as shown in Fig. 3. The movement of the scraper is then reversed by releasing the tail rope 12 and pulling the drag rope 11. The scraper is loaded as it moves forwardly about the curved end of the frame 2, the arrangement being such that the scraper has a considerable lateral bearing on the frame, and the cutting edge 1ᶜ is directed into the pile of loose material to gather the load as the scraper is swept around the frame. The scraper is moved to the chute B and unloaded and is again returned to its initial position ready to collect another load. When sufficient material within reach of the scraper has been collected, the frame 2 is moved forward by means of the draft device 7 and ratchet 8 or its equivalent, to advance the scraper toward the pile. The head frame 2 may be moved into various positions and angles with respect to the material to be removed by fixing the guiding means as desired. In the event that it is desired to change the course of direction of the scraper when moving from the head frame to the loading chute, the auxiliary frame 17 is fixed in the position desired as shown.

It will be understood that my apparatus may be constructed with details differing greatly from the construction illustrated and described herein without departing from the spirit and scope of my invention. I do not therefore wish to be limited to the form of apparatus herein shown and described excepting in so far as specifically limited in the appended claims.

Having described my invention what I claim as new and desire to cover by Letters Patent, is:

1. In an apparatus of the class described, the combination of a frame, means for supporting said frame against lateral movement, and a draft operated scraper, adapted to be moved horizontally about said frame, and having supporting engagement therewith, whereby said scraper is positively directed into the pile of material to gather the same.

2. In an apparatus of the class described, the combination of a frame, means for supporting said frame against lateral movement comprising a guiding device, a draft operated scraper adapted to be moved horizontally about said frame, and having supporting engagement therewith, whereby said scraper is positively directed into the pile of material to gather the same, and means for moving said frame with respect to said guiding device.

3. In an apparatus of the class described the combination of a frame having a curved bearing portion, a scraper having lateral bearing means adapted to conform substantially with said curved portion, flexible draft means for said scraper, guide means for said frame, and means for moving said frame with respect to said guiding means.

4. In an apparatus of the class described the combination of a guiding frame adapted to be fixed against lateral movement and having a curved bearing portion, a scraper having one side thereof provided with bearing means adapted to conform substantially with said curved portion, and draft means for reciprocably moving said scraper, including a winding device remote from said guiding frame, and a deflector guide adapted to be positioned intermediate said guiding frame and said winding device.

5. In an apparatus of the class described the combination of a guiding frame adapted to be fixed against lateral movement, and having a curved bearing portion, a scraper having one side thereof provided with bearing means adapted to conform substantially with said curved portion, and draft means for reciprocably moving said scraper including a winding device remote from said guiding frame, and a deflector guide having a bearing surface curved to conform substantially with the curved portion of said guiding frame, said deflector guide being adapted to be positioned intermediate said guiding frame and said winding device.

6. In an apparatus of the class described, the combination of a scraper, draft means for said scraper, an elongated frame having a curved forward portion about which said scraper is adapted to be moved, and a laterally extending bearing member adjacent its rear end, a guiding device for said frame, and means for moving said frame with respect to said guiding device.

7. In an apparatus of the class described, the combination of a movable frame having a curved forward portion, a scraper having one side thereof curved to conform substantially with said curved portion, draft means for said scraper, a guiding device for said frame, and means for moving said frame with respect to said guiding device.

8. In an apparatus of the class described, the combination of an elongated movable frame having curved forward and rearward portions, a scraper having one side thereof curved to conform substantially with said curved portions, draft means for said scraper, a guiding device for said frame, and means for moving said frame with respect to said guiding device.

9. In an apparatus of the class described, a frame comprising a curved forward portion, a pair of longitudinally disposed parallel beams extending rearwardly from said forward portion, and having a slot therebetween, and means detachably connecting said beams together.

10. In an apparatus of the class described, a frame comprising a curved forward portion, a pair of longitudinally disposed parallel beams extending rearwardly from said forward portion, and having a slot therebetween, and a laterally extending bearing portion adjacent the rear end of one of said beams.

11. The method of gathering and transporting loose material, which consists in reciprocably moving a scraper in a horizontal plane about a frame fixed against lateral movement and positioned adjacent the pile of material to be transported, said frame affording lateral bearing for said scraper while the latter is gathering its load.

12. The method of gathering and transporting loose material, which consists in moving a scraper in a horizontal plane about a frame fixed against lateral movement and positioned adjacent the pile of material to be transported, said frame affording lateral bearing for said scraper while the latter is gathering its load, and intermittently advancing said frame toward the said pile of material.

13. The method of gathering and transporting loose material, which consists in moving a scraper in a horizontal plane about a frame fixed against lateral movement, and positioned adjacent the pile of material to be transported, said frame affording lateral bearing for said scraper while the latter is gathering its load, and intermittently advancing said frame toward the said pile of material by means controlled independently of the scraper actuating means.

14. The method of gathering and transporting loose material, which consists in reciprocably moving a scraper in a horizontal plane about an arcuate frame fixed adjacent the pile of material to be transported, whereby said scraper is directed into said material during its forward movement about said frame and while in lateral engagement therewith.

15. The method of gathering and transporting loose material, which consists in reciprocably moving a scraper in a horizontal plane about an arcuate frame fixed adjacent the pile of material to be transported, whereby said scraper is directed into said material during its forward movement about said frame, and while in lateral engagement therewith, and intermittently advancing said frame toward the said pile of material.

16. The method of gathering and transporting loose material which consists in training a flexible conveyor mechanism including a scraper, about a frame fixed adjacent the pile of material to be transported, said frame having a bearing surface curved in a horizontal plane, and reciprocably moving said scraper about said curved bearing surface whereby it is positively directed into the material to gather the same during its movement in one direction, and intermittently advancing said frame toward the pile of material.

17. The method of gathering and transporting loose material which consists in training a flexible conveyor mechanism including a scraper, about a frame fixed adjacent the pile of material to be transported, said frame having a bearing surface curved in a horizontal plane, reciprocably moving said scraper about said curved bearing surface whereby the scraper is positively directed into the material to gather the same during its movement in one direction, and intermittently advancing said frame toward the pile of material by means independent of the scraper actuating mechanism.

18. The method of gathering and transporting loose material, which consists in fixing a frame adjacent the pile of material to be transported, moving a draft operated scraper in a forward direction about said frame and in lateral engagement therewith whereby the scraper is directed into the pile of loose material to gether its load, continuing the forward pull of said scraper to a place remote from said frame, and returning said scraper in substantially the same path about said frame into position to gather a new load.

19. The method of gathering and transporting loose material, which consists in fixing a frame adjacent the pile of material to be transported, moving a draft operated scraper in a forward direction about said frame and in lateral engagement therewith whereby the scraper is directed into the pile of loose material to gather its load, continuing the forward pull of said scraper to a place remote from said frame, returning said scraper in substantially the same path about said frame into position to gather a new load, and intermittently moving said frame toward the said pile of material.

20. In an apparatus of the class described the combination of a guiding frame adapted to be fixed against lateral movement, and having a curved bearing portion, a scraper having lateral bearing means adapted to conform substantially with said curved portion, and draft means for said scraper.

21. In an apparatus of the class described the combination of a guiding frame adapted to be fixed against lateral movement and having a curved bearing portion, a scraper having lateral bearing means adapted to conform substantially with said curved bearing portion, and an opposite side having an upright cutting edge, said lateral bearing means extending forwardly of said cutting edge, and draft means for said scraper.

22. In an apparatus of the class described the combination of a guiding frame adapted to be fixed against lateral movement, and having a curved bearing portion, a scraper provided with lateral bearing means adapted to conform substantially with said curved bearing portion, and an opposite side having an upright cutting edge, said bearing means extending forwardly of said cutting edge, and draft means for said scraper including a flexible cable connected to said first named side in advance of said cutting edge.

23. In an apparatus of the class described the combination of a guiding frame adapted to be fixed against lateral movement, and having a curved bearing portion, a scraper having one side thereof provided with lateral bearing means adapted to conform substantially with said curved portion, and draft means for said scraper including a cable attached to said first named side adjacent the forward end thereof, and a second cable attached eccentrically of the rear end of the scraper.

24. In an apparatus of the class described, the combination of a frame having a curved bearing portion, means for supporting said frame against lateral movement and a draft operated scraper having lateral engagement with said bearing portion at a plurality of points and extending into position to gather a load while moving about said frame.

25. In an apparatus of the class described, the combination of a movable frame having a curved bearing portion, means for temporarily holding said frame against lateral movement, and a draft operated scraper having lateral bearing engagement with said curved portion and extending laterally therefrom into position to gather a load while moving about said frame.

26. In an apparatus of the class described, the combination of a guiding frame adapted to be fixed against lateral movement and having a curved bearing portion, a scraper having one side thereof provided with bearing means adapted to conform substantially with said curved portion, draft means for reciprocably moving said scraper to a loading station and a deflector guide adapted to be positioned intermediate said frame and said unloading station.

27. In an apparatus of the class described the combination of a guiding frame adapted to be fixed against lateral movement and having a curved bearing portion, a scraper having one side thereof provided with bearing means adapted to conform substantially with said curved portion, draft means for reciprocably moving said scraper and a deflector guide for said scraper having a bearing surface curved to conform substantially with the curved portion of said guiding frame and adapted to be fixed remote from the latter.

28. In an apparatus of the class described the combination of a frame having a curved bearing portion, a scraper having lateral bearing means adapted to conform substantially with said curved portion, flexible draft means for said scraper, guide means for said frame and means independent of said draft means for moving said frame with respect to said guiding frame.

CHARLES E. DAVIS.